C. J. JOHNSON.
CUTTING TOOL.
APPLICATION FILED JAN. 31, 1913.
1,111,388.
Patented Sept. 22, 1914.
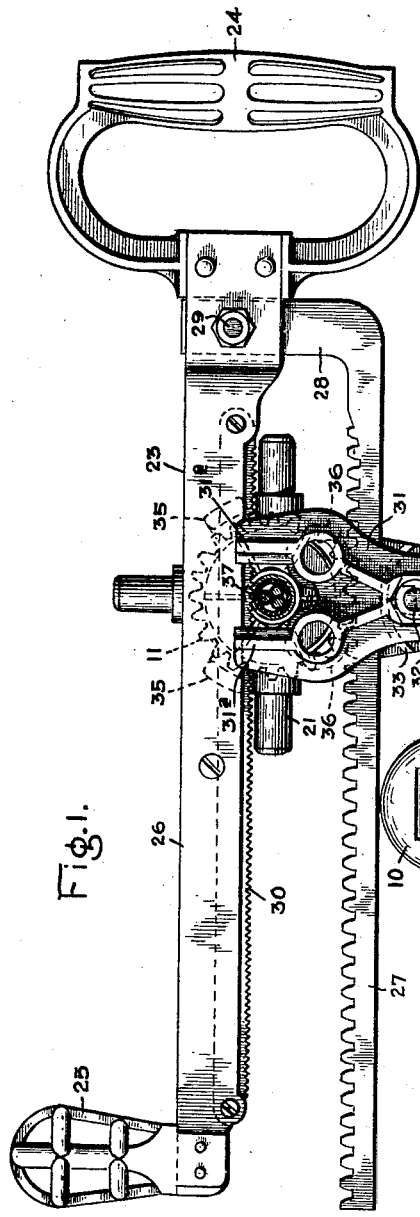
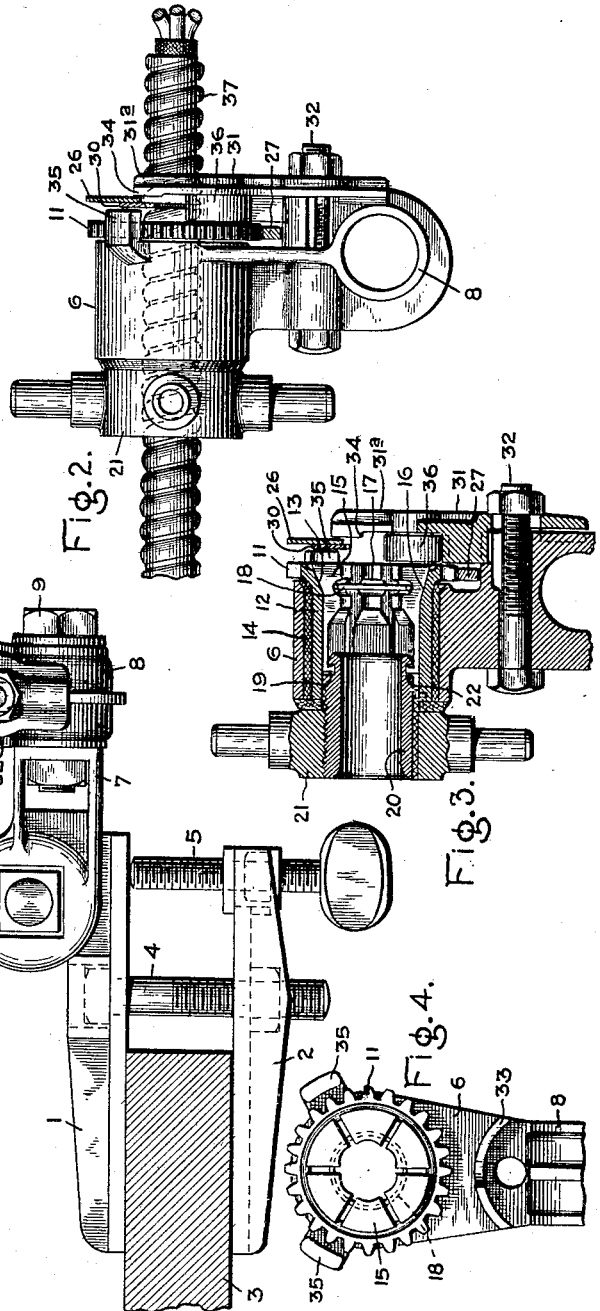
Witnesses:
Marcus L. Byng
J. Ellis Glen
Inventor:
Charles J. Johnson,
by Alfred G. Davis
His Attorney.

UNITED STATES PATENT OFFICE.

CHARLES J. JOHNSON, OF NEW YORK, N. Y., ASSIGNOR TO GENERAL ELECTRIC COMPANY, A CORPORATION OF NEW YORK.

CUTTING-TOOL.

1,111,388.     Specification of Letters Patent.     Patented Sept. 22, 1914.

Application filed January 31, 1913. Serial No. 745,410.

*To all whom it may concern:*

Be it known that I, CHARLES J. JOHNSON, a citizen of the United States, residing in the borough of Manhattan, State of New York, have invented certain new and useful Improvements in Cutting-Tools, of which the following is a specification.

My invention has reference to a cutting tool, and has for its object the provision of a tool of this character which is cheap, compact and efficient in operation.

My invention is particularly useful for cutting armor from cables, although it will be obvious that it is not limited to such use.

For a fuller understanding of my invention, reference is had to the accompanying drawing, in which—

Figure 1 is a front elevation of a cutting tool embodying my invention; Fig. 2 is a side view of the tool with the reciprocating member omitted; Fig. 3 is a vertical sectional view of Fig. 2 and Fig. 4 is a front elevation of the supporting head and the gear which is mounted thereon.

The tool is shown supported by a vise composed of two clamping jaws, 1 and 2, which are secured to a stationary support 3 by clamping screws 4 and 5. The tool is held by a head 6 which is connected to the vise by an arm 7, the outer end of which is journaled in a cylindrical bearing 8 formed in the head 6 and by which the head may be given a rotary movement with reference to the arm 7. The head is made rigid with the arm 7 by means of a clamping bolt 9, and the arm 7 is pivotally connected to the vise by a suitable adjustable head 10. A gear wheel 11 secured to a bearing sleeve 12 and here shown integral therewith, is provided at its inner end with a conical surface 13. A cylindrical bearing member 14 is interposed between the sleeve 12 and the head 6. A chuck is located within the sleeve 12 and comprises a series of disconnected gripping jaws 15 provided at their outer ends with tapering surfaces 16, which are adapted to engage the conical surface 13 of the sleeve 12. The inner edges of these jaws are provided with recesses 17, within which is received a spring ring 18 for the purpose of opening the jaws when they are out of engagement with the work. The inner ends of the jaws are shaped to form hooks 19, and a cylindrical sleeve 20 is provided with an annular groove 22 whose shoulders are adapted to engage the hooked ends 19 of the clamping jaws. A longitudinal movement is given to the cylinder 20 and to the jaws 15 by a hand wheel 21 which forms a screw-threaded connection with the cylindrical member 20.

A reciprocating member 23 having suitable hand grips 24 and 25 is provided with two arms 26 and 27, the latter of which is in the form of a rack-bar which engages the gear wheel 11. The inner end of the bar 27 is provided with an upturned shank 28 by which the rack bar is secured to the hand member by a bolt 29. A cutting edge 30, which is here shown as a hack-saw, is detachably secured to the arm 26.

A clamping plate 31 is secured against the face of the tool by a clamping bolt 32, which holds the clamping plate rigidly against a segmental lug 33 extending outwardly from the head 6 and against the cylindrical bearing member 8 of the head 6. The upper end of the clamping plate is formed into a yoke, the upstanding legs 31ᵃ of which are provided with inwardly extending bosses 34 which, with outwardly extending lugs 35, which project from the top of the head 6, form a guide for the arm 26. The space between the two legs 31ᵃ accommodates the work. Anti-friction rollers 36 are carried on the inner face of the plate 31 for supporting the work. The work 37 is here shown in the form of an armored cable. The arm 27 is held in position by the clamping plate 31, which, with the front of the head 6 and the segmental lug 33, form a guideway for the arm 27.

To operate the tool the work is gripped in position by turning up the hand wheel 21 and the reciprocating member 23 moved back and forth across the work with the hack-saw 30 engaging the periphery of the work, which is caused to rotate in the opposite direction by the rack-bar acting upon gear 11, so that the periphery of the work is always moving in opposition to the movement of the cutting edge, which is obviously a great advantage. Furthermore, the ratio of the angular velocity of the work to the movement of the reciprocating member 23 in whichever direction the reciprocating member is moving is constant; and this insures a uniform depth for the kerf, which is obviously a great advantage when the tool is used for cutting the armor from insulated cables. At the same time, as the work is gripped closely to the cutting edge, it is possible to cut the armor smoothly and without leaving any protruding burs which are so liable to result when armor is cut. It is also obvious that the tool embodying my invention may conveniently be used on any portion of the cable, as the longitudinal reciprocating motion necessary for this operation may take place either at the end of the cable or at a distance therefrom, which under some circumstances is a desirable feature.

While I have shown my invention as hand-operated, I do not desire to limit my invention to this feature, as it is apparent that it could be automatically operated. Furthermore, while I have shown my invention in connection with an armored cable, it is obvious that the tool could be used for other kinds of work, for example, plain metal bars or pipes.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means within the scope of my claims.

What I claim as new and desire to secure by Letters Patent of the United States, is:—

1. In a cutting tool, the combination of rotatably mounted means for gripping the work, means for holding a cutting edge adapted to be reciprocated across the work, and means for rotating said gripping means and the work at least one complete revolution in opposition to the movement of said cutting edge during each full cutting movement of the latter at a speed bearing a constant relation thereto.

2. In a cutting tool, the combination of rotatably mounted means for gripping the work, means for holding a cutting edge adapted to be reciprocated across the work, and means for rotating said gripping means and the work at least one complete revolution in opposition to the movement of said cutting edge during each full movement of the latter each way.

3. In a cutting tool, the combination of a rotatably mounted chuck for holding the work, means for holding a cutting edge adapted to be reciprocated across the work, and toothed gearing connecting said chuck with said holding means whereby the work is positively rotated in opposition to the cutting movement of said edge at a speed bearing a constant relation thereto.

4. In a cutting tool, the combination of rotatably mounted means for gripping the work, means for holding a cutting edge adapted to be reciprocated across the work, and means for rotating said gripping means and the work connected with said holding means so as to be operated by the cutting movement of the same and acting to rotate the work only in opposition to the movement of the cutting edge.

5. In a cutting tool, the combination of a rotatably mounted clutch for the work, a reciprocating cutting edge, and means controlled by the movement of the cutting edge for causing the clutch to make at least one complete revolution during each stroke of the cutting edge.

6. In a cutting tool, the combination of rotatably mounted means for gripping the work, means for holding a cutting edge free to be reciprocated across the work in strokes of any length less than that of said edge, and means for rotating said gripping means and the work so connected with said holding means as to be operated by the cutting movement of the same without interference with the freedom of variation of the length of its strokes and as to rotate the work only in opposition to the movement of the cutting edge, regardless of the length of the stroke.

7. In a cutting tool, a supporting head, a chuck revolubly mounted thereon for holding the work, a member adapted to be reciprocated across the work provided with two parallel arms, one of which is provided with a cutting edge for engaging the work and the other of which is adapted to rotate the work.

8. In a cutting tool, a supporting head, a chuck revolubly mounted thereon for holding the work, a gear secured thereto, and a reciprocating member provided with two parallel arms, one of which is provided with a cutting edge for engaging the work and the other of which is provided with a rack for engaging said gear.

9. In a cutting tool, a supporting head, a chuck revolubly mounted thereon for holding the work, a gear secured thereto and concentric therewith, a reciprocating member provided with hand grips and two parallel arms, one of which is provided with a hack saw for engaging the work and the other of which is provided with a rack adapted to engage said gear on the side opposite that edge of the work engaged by the hack saw, whereby the movement of the periphery of the work is always in opposition to the movement of the hack saw.

10. In a cutting tool, a supporting head, a chuck revolubly mounted thereon for holding the work, a gear secured to said chuck, a reciprocating member having two arms, one of which is provided with a hack saw arranged to engage the work and the other of which is provided with a rack for engaging said gear, and a plate arranged to be clamped to the face of the head and forming therewith guideways for holding the rack arm in engagement with the gear and for guiding the arm carrying the cutting edge.

11. In a cutting tool, a supporting head, a chuck revolubly mounted thereon for holding the work, a gear for rotating the chuck, a longitudinally movable member provided with two horizontal arms, one of which is provided with a cutting edge for engaging the work and the other of which is provided with a rack for engaging said gear, and a plate arranged to be clamped to the face of the tool and forming therewith a guideway for holding said rack-bar in engagement with said gear, and also forming therewith a guideway for the arm carrying the cutting edge, and friction rollers carried by said plate for supporting the end of said work.

12. In a cutting tool, a supporting head, a chuck revolubly mounted thereon for holding the work, means for rotating the chuck comprising a longitudinally movable member provided with a cutting edge for engaging the work, and a member arranged to be secured to the face of the head provided with anti-friction rollers for supporting the work.

In witness whereof, I have hereunto set my hand this 28th day of January, 1913.

CHARLES J. JOHNSON.

Witnesses:
WM. T. RUDD,
H. F. COSGROVE.

Copies of this patent may be obtained for five cents each, by addressing the "Commissioner of Patents, Washington, D. C."